Dec. 3, 1929.     C. M. TURSKY     1,737,985
FUEL OIL VALVE
Filed Dec. 18, 1925     2 Sheets-Sheet 2
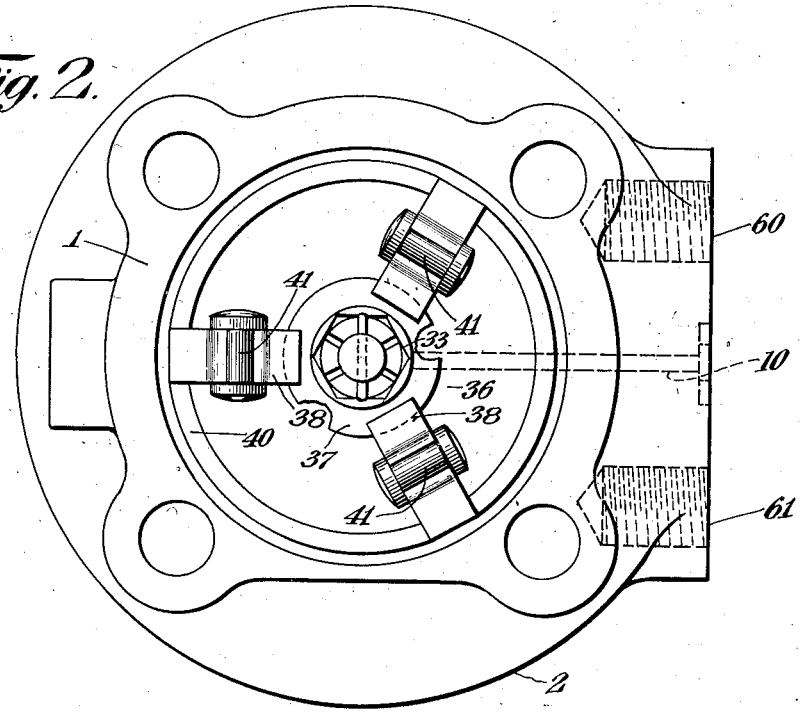
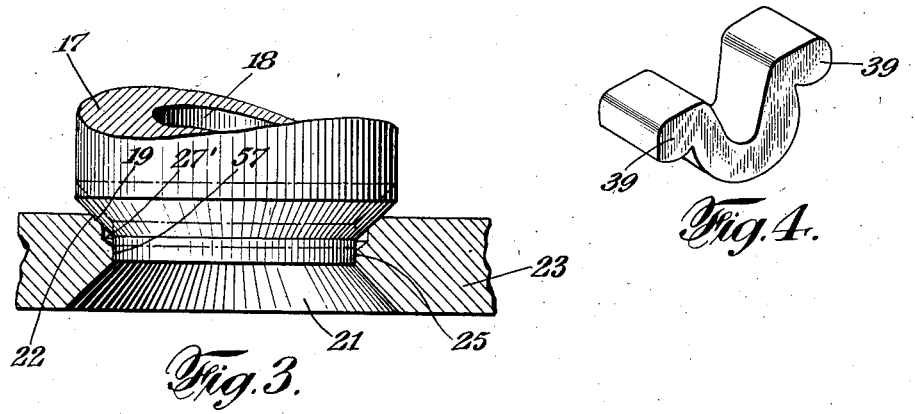
Inventor
Charles M. Tursky
By his Attorneys
Kenyon & Kenyon Patented Dec. 3, 1929

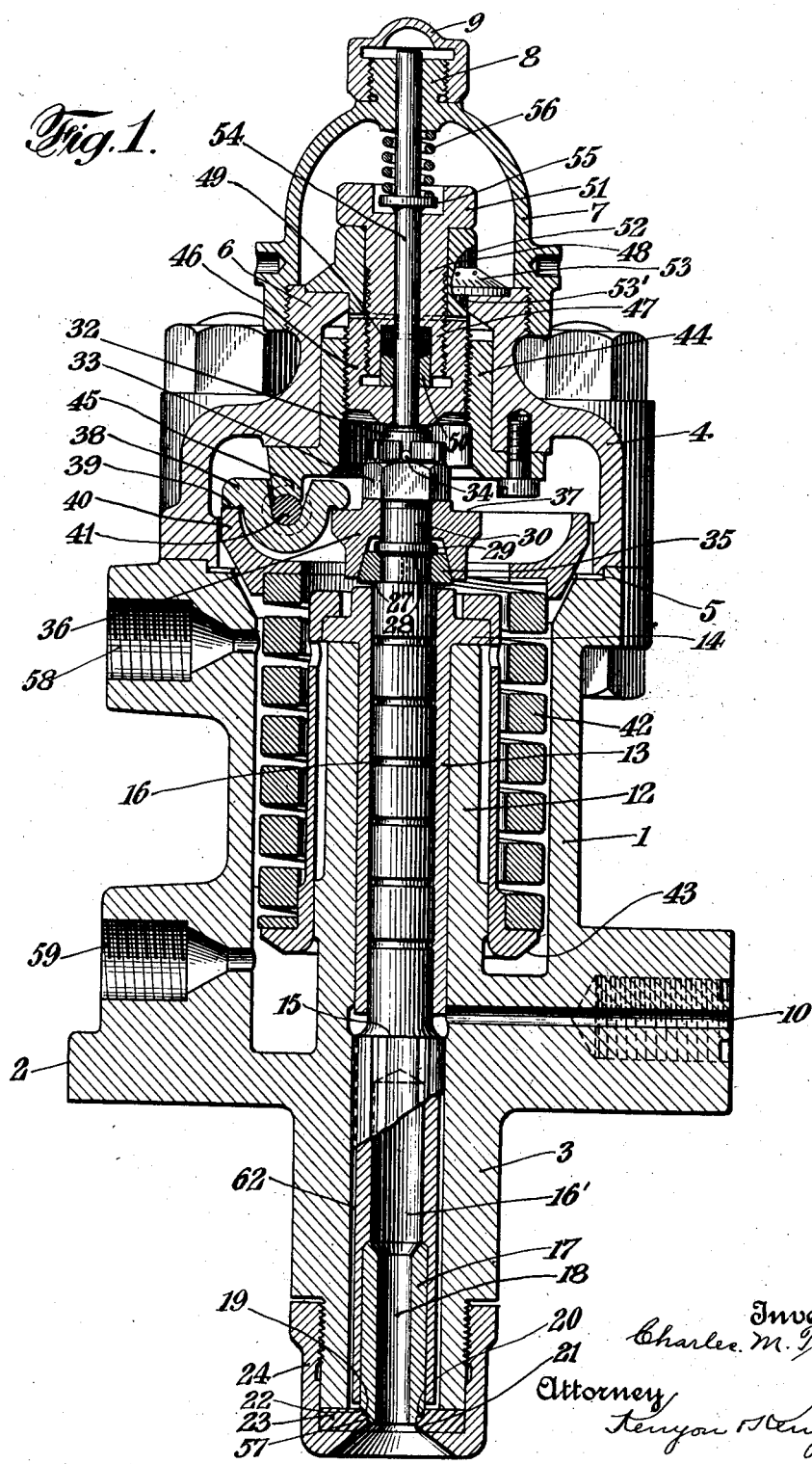

1,737,985

UNITED STATES PATENT OFFICE

CHARLES M. TURSKY, OF NEW YORK, N. Y., ASSIGNOR TO WHALEY ENGINE PATENTS, INC., OF NEW YORK, N. Y., A CORPORATION OF DELAWARE

FUEL-OIL VALVE

Application filed December 18, 1925. Serial No. 76,160.

This invention relates to improvements in valves adapted to control the flow of fuel oil into the cylinders of internal combustion engines, and more particularly adapted for use in engines where the oil is injected into the cylinder under a high pressure, such as several thousand pounds per square inch.

The primary object of the invention is to provide a valve which will ensure the supply of the fuel by the valve at a relatively high initial pressure.

Fig. 1 is a sectional view showing the relative positions of the assembled valve parts.

Fig. 2 is a top view of the lower part of the valve.

Fig. 3 is a detail view.

Fig. 4 is a detail view.

The entire mechanism of my fuel valve is enclosed in a casing, the lower part of which is a body 1 provided at its lower end with a flange 2 adapted to be bolted to the top of the cylinder of the engine with which it is to be used. Coaxially projecting below the flange 2, I provide a cylindrical extension 3 which is adapted to pass through an opening in the cylinder head of the engine, into the cylinder clearance. Above the body 1, and bolted to it, I provide a hollow cap 4 mounted coaxially thereon, and maintained in position laterally by a shoulder 5. The cap 4 is reduced in diameter at its upper portion 6 to which is secured a smaller dome shaped cap 7 provided at its upper end with a threaded portion 8 over which is screwed a small cap 9. To one side of the flange 2 I provide a fuel intake duct 10 in the base flange 2. Concentrically within the casing 1 is provided a sleeve 12 which I prefer to make integral with the casting forming the base 1, and into which sleeve I insert a tubular bearing 13 of bronze, or other suitable, anti-friction metal. The bearing 13 is provided with a flanged head 14 at its upper end. The flange 14 seats on the upper end of the sleeve 12. Mounted within the bearing sleeve 13 is a spindle 15 comprising the movable element of the fuel valve. This spindle 15 is free to move vertically (longitudinally) within the bearing 13 and may be provided at intervals throughout its length in the bearing sleeve 13 with oil grooves 16. The lower end of the spindle 15 is enlarged in diameter under the sleeve 13 and is formed with a longitudinal coaxial recess 16' which extends for an appreciable distance from the lower end of the spindle 15. In order to permit the fuel oil to reach the nozzle I form the lower outside diameter of the spindle 15 with longitudinal grooves 62, running from the oil inlet 10 to the end of the spindle near the valve seat 23. Within the recess 16' I insert a sleeve of stellite 17 or other suitable material. The lower end of the recess 16' is enlarged in diameter to receive the same. The sleeve 17 is provided at its lower end, which extends beyond the end of the spindle 15 with outside and inside chamfered surfaces 19 and 20. The chamfered surface 19 terminates in a cylindrical surface 57, Fig. 3. Normally the chamfered surface 19, which forms the frustrum of a cone, bears against a similar surface 22 in the valve seat 23, which may be an annular disc of suitable material, such as stellite, fastened concentrically to the lower end of the projection 3 by a cap nut 24, as shown in Fig. 1.

The cylindrical portion 57 of the sleeve 17 is adapted to move into and out of an opening 25, as shown in Fig. 3. Between the conical surface 22 and the cylindrical surface 25 in the annular disc 23, I construct a groove 27' which lessens the amount of surface between the valve and its seat that needs accurate finishing.

The upper end of the spindle 15 is formed with a shoulder 27 above which the spindle extends at a reduced diameter for a short distance, and then is enlarged again, forming a head 29 having the original diameter of spindle 15. Above the head 29 the spindle extends at a reduced diameter 30. The last reduction is provided with a thread, upon which the nut 33 is screwed. The reduced portion of the spindle 32 is drilled to accommodate a cotter pin 34 to prevent the nut 33 from working loose.

Above the shoulder 27, and below the shoulder 29, I insert a collar 35 which, in order to insert in place, I make in two diametrically opposite sections. The lower surface of the collar 35 is substantially a plane surface extending at right angles to the axis of the shaft 15, thereby conforming to the surface of shoulder 27. The upper surface of the collar 35 is chamfered to conform with the conical lower surface of the enlarged portion 29. The outside surface of the collar 35 is conical as shown. Mounted over the outside surface of the collar 35 I provide an annular cap 36 which is made to fit snugly upon the reduced portion 30 of the spindle 15 and the upper central surface, of the cap 36, is adapted to be engaged by the lower surface of the nut 33, the parts being so formed that when the nut 33 is against the top of the cap 36 the latter, by reason of its interior conical surface, has brought the two sections of the collar 35 together, and up against the shoulders, as previously referred to.

The purpose of this construction will be seen more clearly later on. It might be stated at this juncture, however, that the principal reason for making the cap 36 in this fashion is to permit its being replaced readily by another one having a different form, to provide a change in adjustment. The upper part of the cap 36 is provided with an annular surface 37, the plane of which is perpendicular to the longitudinal axis of the spindle 15 and upon which surface one end of a number of rockers 38 bear. The rockers 38 are U shaped, as shown more clearly in Fig. 4, with an overhanging shoulder 39 at each end. The under surface of the overhanging shoulder is rounded as shown. Referring to Fig. 1, the inner end of the rocker 38 bears downwardly against the annular surface 37 of the nut 36 while the outer end of the rocker 38 bears downwardly against the upper end of a flanged ring 40. The center portion of the rocker 38 finds a bearing against a pin 41, the axis of which pin is preferably in the plane of the annular surface 37, and also the top surface of the ring 40. The lower end of the ring 40 is recessed to receive the upper end of a coiled spring 42 which in the present instance I have shown made of resilient material rectangular in cross section. Between the lower end of the spring 42 and the upper end of the flanged head 14 on the bearing 13, I provide a spring carrier 43 concentrically mounted with reference to the bearing 13 and the sleeve 12. The spring carrier 43 forms an abutment to the downward thrust of the spring 42. The upward resilient action of the spring acts against the ring 40 which in turn presses upwardly against the outer ends of the rockers 38 and by reason of the pin 41, acting as a fulcrum, the rocker produces a downward thrust upon the spindle 15 by reason of the rocker 38 bearing against the cap 36, as shown, so that the valve is closed with a predetermined initial pressure. By this construction it is possible to locate the spring in the most convenient position, where it can be easily reached, and where it does not interfere with the accessibility of the upper parts of the mechanism. This construction also enables me to change, if necessary, the rockers so as to vary the ratio in the lever arms of the rockers 38 so as to increase or decrease the effect of the downward pressure on the spindle 15 without changing the strength of the spring 42. The pins 41 bear against projections 45, extending downwardly from a sleeve 44 mounted concentrically in the cap 4. The inside diameter of the sleeve 44 is threaded, and into it is screwed a plug 46 provided with a concentric longitudinal theaded recess 47 into which is screwed a bolt 48; the lower end of the bolt is longitudinally recessed to form a stuffing box 49; a collar 50 is inserted into the head of the recess for the same purpose, as shown. The upper end of the bolt has a head 51 made hexagon-shaped or with flat surfaces, so it may be easily turned. Slipped over the outside of the bolt is provided a collar 52 similarly provided with hexagon or flat surfaces for rotating conveniently with a wrench. The collar 52 is provided with a projecting flange 53 having its upper surface graduated as shown in Fig. 1, for adjustment purposes. The collar 52 bears against the upper surface of the cap 4 and is provided with a concentric longitudinal projection 53' which passes through the central opening of the cap 4, engaging with the upper end of the plug 46, and is adapted to rotate the plug 46 in one direction or the other, as desired. The collar 52 may be provided with projections at its lower end which engage with corresponding recesses in the upper end of the plug 46, for this purpose, or in any other well-known manner, which permits the plug 46 to be rotated without interfering with its moving up or down as it is rotated. After the collar 52 has been rotated so as to adjust the plug 46 in its vertical position to limit the upper travel of the spindle 15 to a predetermined amount, and thereby controlling the opening of the fuel nozzle orifice, to the desired predetermined amount, the bolt 48 is rotated, thereby locking the plug 46 so that it cannot rotate, it being remembered that there is always a clearance between the lowermost surface of the collar 52 and the uppermost surface of the plug 46.

Concentrically passing through the bolt 51 and the plug 46, is provided a pin 54 which bears against the upper end of the spindle 15. The pin 54 is provided with a shoulder 55 against which a spring 56 bears to hold the pin 54 against the upper end of the spindle 15, causing it thereby to assume the movements of the spindle. The upper end of the spring 56 bears against the inside of a dome cap 7. The pin 54 passes through a concentric hole in the dome cap 7 and extends a short distance above the same on the outside of the cap 7. The purpose of the pin 54 is to have a means whereby indications may be recorded of the movements and travel of the spindle 15 as to the time of its operation with reference to the time of operation of the various parts of the engine. During the time these tests are being made the cap 9 is removed, and any suitable indicating or recording device is applied directly to the upper end of the pin 54.

In order to prevent the high pressure oil (passing to the nozzle of the valve) from leaking through the joints at various places into the chamber containing the spring 42 and other parts, I provide means adapted to maintain this chamber full of oil under a given pressure, which may be less than that of the high pressure oil supply, at all times. Suitable connections 58 are provided in the side of the casing 1 for piping to be assembled to the same for the oil supply. On each side of the high pressure inlet 10 is a threaded hold 60—61 which provides means for bolting the valve to its source of high pressure oil supply.

In operation the fuel oil is supplied to the intake duct 10 from a suitable high pressure source. This oil flows down the grooves 62 in the side of the valve 15 but is prevented from escaping by the valve member 17 when the latter rests upon its seat 22. As the supply of oil to the duct 10 continues pressure is built up between the sleeve 13 and the valve 15; and when this pressure reaches a predetermined point, say about 2000 lbs. per square inch, the sleeve 13 is elevated by the oil until the top of said sleeve abuts against the lower surface of the collar 35. During this elevation of the sleeve 13 the carrier 43 bears upwardly against the bottom of the spring 42 and compresses the latter, the resiliency of the spring 42 determining the pressure at which the sleeve 13 is elevated by the oil. The spring acts through the rockers 38 to press the valve upon its seat with a pressure which is equal to that of the spring when the lever arms of the rockers are of equal length. As the oil pressure builds up further in the duct 10 and in the space below the sleeve 13, the parts remain in relatively fixed positions for an interval until the pressure has increased sufficiently to permit the sleeve 13, collar 35 and piston 15 with the parts carried thereby, to move against the pressure exerted downwardly thereon by the spring 42 through the agency of the levers 38. This is at a pressure equal to the pressure at the time the sleeve 13 is moved into engagement with the collar 35, plus the further pressure by which the spring tends to hold the valve 15 closed, or approximately double the pressure at which the sleeve 13 begins to rise, for example about 4000 lbs. per square inch when the lever arms of the rockers are of equal length. By reason of this operation, valve 15 is opened only when the pressure of the fuel supply has reached a predetermined high point.

Referring to Fig. 3, the elevation of the valve member 17 immediately moves the conical sealing surface 19 off its seat 22, so as to open communication into the groove or recess 27'; but during the first part of the upward movement of the valve member 17 the cylindrical part 25 thereof remains in contact with the cylindrical part of the valve seat thus preventing the escape of the fuel oil from the valve. When the valve is full open, a very narrow slit-like oil passage is formed between the lowermost edge 17' of the member 17 and lower edge of the groove 27'. The movement of the valve away from its seat is limited by the engagement of the upper end of the valve stem with the lower surface of the member 46. The latter member is so set that the amount of valve opening cannot exceed a predetermined amount at which the oil pressure in the valve remains at the desired high point. The amount of opening of the valve may be varied by adjusting the position of the member 46 through the member 52 as described above.

It is evident that many changes can be made in the construction shown without in any way departing from the scope of the invention.

Having thus described my invention, what I claim as new and desire to secure by Letters Patent of the United States is:—

1. A valve having a movable valve member, means tending to hold said member in closed position, and means operated by the valve controlled fluid and coacting with said holding means to increase the force tending to hold said member in closed position.

2. A valve having a movable valve member, means tending to hold said member in closed position, and operating means for moving said member to an open position, said operating means coacting with said holding means to increase the force tending to hold said member in closed position.

3. A valve having a movable valve member, a spring, means coacting with said spring and said member whereby said spring tends to hold said member in its closed position, means for moving said movable valve member to an open position, and means whereby said last named means applies force to said spring in a direction tending to hold said movable valve member in its closed position.

4. A valve having a movable valve member, a spring, means acted upon by said spring in one direction and acting upon said member in the opposite direction whereby said spring tends to hold said member in its closed position, means for moving said movable valve member to an open position, and means whereby said last named means applies force to said spring in a direction tending to hold said movable valve member in its closed position.

5. A valve having a movable valve member, a spring, means coacting with said spring and said member whereby said spring tends to hold said member in its closed position, means actuated by the fluid controlled by the valve for moving said movable valve member to an open position, and means whereby said last named means applies force to said spring in a direction tending to hold said movable valve member in its closed position.

6. In a fuel oil valve, a valve seat and a valve spindle, a coiled spring surrounding the spindle and rockers between the spindle and the spring for transmitting pressure from one to the other.

7. In a fuel oil valve, a valve seat, a movable valve member, and means adapted to hold the movable valve member against its seat, said means comprising a coiled spring surrounding said valve member and under initial pressure tending to act in one direction, and a plurality of rockers against one end of which the spring acts, said movable valve member being provided with means against which the other ends of the rockers act in the opposite direction.

In testimony whereof, I have signed my name to this specification.

CHARLES M. TURSKY.